United States Patent

[11] 3,576,527

| | | |
|---|---|---|
| [72] | Inventor | William E. Howard<br>Baltimore, Md. |
| [21] | Appl. No. | 735,595 |
| [22] | Filed | June 10, 1968 |
| [45] | Patented | Apr. 27, 1971 |
| [73] | Assignee | The Bendix Corporation |

[54] SAFETY ALERT FOR AUTOMOBILE BRAKE SYSTEMS
3 Claims, 1 Drawing Fig.

[52] U.S. Cl. ..................................................... 340/67,
340/72
[51] Int. Cl. ..................................................... B60q 1/38,
B60q 1/46
[50] Field of Search .......................................... 340/56, 67,
72

[56] References Cited
UNITED STATES PATENTS

| 3,243,773 | 3/1966 | Leichsenring | 340/72 |
| 3,263,123 | 7/1966 | Leeder | (340/81UX) |
| 3,308,428 | 3/1967 | Grontkowski | 340/81 |
| 3,428,943 | 2/1969 | Carp et al. | 340/81X |
| 3,460,089 | 8/1969 | Gregory | 340/67 |

*Primary Examiner*—John W. Caldwell
*Assistant Examiner*—Kenneth N. Leimer
*Attorneys*—Plante, Arens, Hartz and O'Brien and Lester L. Hallacher ABSTRACT: This invention describes a system wherein the brake lights of an automobile flash on and off for a predetermined period of time after the actuation of the automobile brakes. After the lapse of the flashing period the brake lights remain in a steady on condition for the remainder of the braking period. The flashing of the brake lights is accomplished by incorporation of a solid-state circuit into the turn signal circuit presently available in most automobiles. The solid-state circuit includes a flasher unit which actuates the brake lights at the beginning of the automobile braking period. A current sensitive switch shorts out the flasher after a predetermined period of time, after which the brake lights remain steadily on.

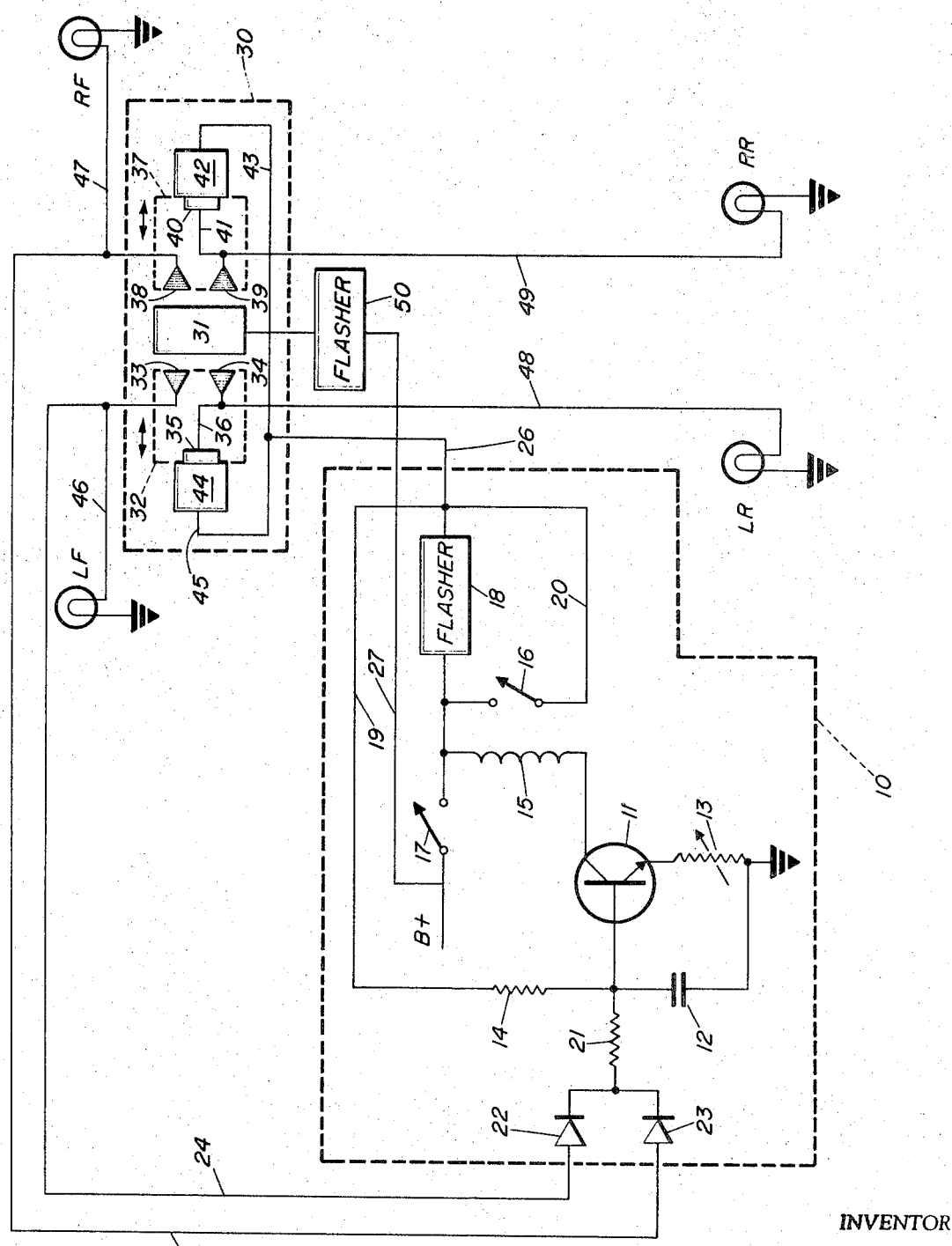

SAFETY ALERT FOR AUTOMOBILE BRAKE SYSTEMS

All existing automobiles include a brake switch which is used to actuate the taillights of the automobile to indicate that the brakes have been applied and the automobile will therefore decrease in speed and possibly stop. Even although this safety feature exists in automobiles, statistical studies indicate that a large percentage of automobile accidents occur because the driver following the decelerating automobile is unaware of the deceleration in time to apply his own brakes and thereby avoid an accident. One possible reason for this is the inability of the following driver to detect a change of intensity of the brake lights of the preceding automobile in instances in which he is not actually looking at the brake lights when they change in intensity. This difficulty occurs particularly at night, when the automobile taillights are illuminated. For this reason it is felt, by individuals involved in automobile safety studies, that an initial flashing of the brake lights would increase the safety feature of said lights and would more readily indicate to following drivers that the brake had been applied and deceleration of the automobile is therefore taking place.

It is therefore an object of this invention to provide a system which causes a flashing of the brake lights of an automobile for a predetermined period of time immediately following the application of the brakes.

It is another object of this invention to provide such a system in which the brake lights remain in a steady on condition after the lapse of the flashing period.

It is another object to provide such a system in which the flashing capability is quickly reactivated after the brakes are released so that the flashing reoccurs upon the reapplication of the brakes and therefore the brake lights will flash almost continuously in instances in which the brakes are pumped.

It is another object to provide such a system which operates in conjunction with the turn signal circuit presently available in most existing automobiles.

It is another object to provide such a system in which the turn signal indications override the flashing function of the flashing circuit.

It is another object to provide such a system which can be incorporated into existing automobiles without redesigning or rebuilding the turn signal circuit presently available in the automobile.

Further objects, features and advantages of the invention will become apparent from the following description and claims when read in view of the accompanying drawings, wherein like numbers indicate like parts and in which:

The FIGURE shows a preferred embodiment of the invention.

The FIGURE shows a preferred embodiment of the instant invention in which the inventive flashing circuit is indicated generally by reference numeral 10 and the turn signal circuit by reference numeral 30. The inventive flasher circuit includes a transistor 11, the base of which is connected to ground through a capacitor 12. The emitter is connected to ground through a variable resistor 13. The collector is connected to the coil 15 of a current sensitive switch 16. A positive voltage supply, which ordinarily would be the automobile battery, is connected through a switch 17 to a flasher 18. Switch 17 is the brake switch of the automobile and therefore is closed by the application of the automobile brakes. The output of the flasher 18 is fed back via line 19 and resistor 14 to the base of transistor 11. The closing of switch 16 shorts out flasher 20 by completing the conductive path of line 20. Two diodes 22 and 23 are connected to the base of the transistor 11 through a resistor 21. Diode 22 is connected to the Left Front turn signal via line 24 and diode 23 is connected to the Right Front turn signal via line 25.

The turn signal circuit 30 is the usual circuit contained in most automobiles and is shown primarily to more clearly illustrate the incorporation of flashing circuit 10 into the present turn signal system. The turn signal circuit 30 is shown containing a conductive contact 31 which receives the positive potential of the automobile battery through a flasher 50. A nonconductive sliding element 32 having electrical contacts 33, 34 and 35 is used to actuate the Left Front and Rear turn signal lamps. Contact 33 is connected to the Left Front lamp by line 46 and contact 34 is connected to the Left Rear lamp by line 48. Contact 35 of element 32 is electrically connected to contact 34 by line 36. Electrical contact 44 is physically and electrically contiguous with contact 35 in the normal position of element 32. In this manner contact 44 is connected to the Left Rear lamp via contacts 34 and 35 and lines 36 and 48. Lines 26 and 45 connect contact 44 to the voltage supply. A similar arrangement is used for the right turn circuit.

The operation of the turn signal circuit is such that upon the application of an input signal from the brake switch 17 the Left Rear lamp flashes on and off due to its actuation by way of lines 26 and 45, contacts 44, 35, 34 and line 48. The Right Rear lamp is actuated by way of lines 26 and 43, contacts 39 and 40, 41 and 42 and line 49. It should be noted that in the prior art systems the brake lights are steadily on because the positive is applied directly to the contacts 42 and 44. When a turn is indicated, for example a left turn, element 32 is moved such that contacts 33 and 34 are in physical and electrical contact with contact 31. A positive potential is then applied to the Left Front and Rear lamps through contacts 31, 33 and 34 and lines 27, 46 and 48 connecting them. Because the potential is applied through flasher 50 the turn signals will flash on and off. It should be noted that the sliding of the element 32 broke the electrical contact between contacts 35 and 44 and therefore the Left Rear light will indicate the left turn but will not indicate the braking of the automobile upon the application of the brakes. Obviously the same operation takes place when a right turn is indicated, the only difference being the movement of element 37.

The operation of the flashing circuit 10 can best be understood by considering two modes of operation: the first mode in which no turn is being indicated by the turn signal circuit, and the second mode in which a turn is being indicated. In the no turning mode of operation the status of the circuit is as shown in the FIGURE. Upon the application of the brakes, switch 17 is closed applying the positive potential to flasher 18. Flasher 18 then yields a series of pulses as its output. These pulses are applied to the turn signal circuit via line 26 and the Right and Left Rear lamps therefore flash on and off. The output of the flasher 18 is fed back to the base of transistor 11 via line 19 and resistor 14. The output of the flasher is not sufficient to cause transistor 11 to conduct and therefore the transistor remains nonconductive until the charge on capacitor 12 has built up to a sufficient level to cause conduction. The flasher 18 will therefore yield several output pulses before transistor 11 conducts. The number of flashes required to cause conduction is a design feature which is dependent primarily upon the setting of variable resistor 13. When transistor 11 conducts the collector current flows through coil 15 causing switch 16 to close. The flasher 18 is then shorted out and the brake lights remain steadily on during the entire time that switch 17 remains closed. When switch 17 is opened, due to the release of the brake pedal, no feedback voltage is applied to the base of transistor 11 and capacitor 12 discharges through the base-emitter junction of transistor 11. The discharge time is very short due to the setting of resistor 13 and the low impedance of the transistor junction. The interruption of current flow in coil 15 causes switch 16 to open and the circuit has returned to its normal nonconductive state. Because the discharge time of capacitor 12 is short the flashing capability is promptly reinstated upon the opening of switch 17 and the flashing function is resumed, even although the brakes are reapplied shortly after the release of their initial application.

In the turning mode of operation it is preferable that the turn signal circuit override the flashing circuit. This is accomplished by the use of diodes 22 and 23. Assuming a left turn signal indication, contacts 33 and 34 will be electrically and physically contiguous with contact 31. The Left Front and Rear turn signals will therefore be flashing on and off while brake switch 17 is open. When brake switch 17 is closed a potential is present as an input to flasher 18; however, this will not actuate flasher 18 because the input to the base of transistor 11 from the Left Front lamp through diode 22 renders the transistor conductive, immediately closing switch 16 and shorting out flasher 18. Consequently the Right Rear lamp will go steady on to indicate the application of the brakes. In this condition a driver behind the braking vehicle will see the Left Rear lamp flashing on and off indicating a left turn and the Right Rear lamp steadily on indicating a braking condition of the automobile. This is the same as the operation of the presently existing turn signal circuits.

It is therefore seen that the presently existing turn signal circuits can be modified to yield a flashing of the rear brake lights simply by incorporating the flashing circuit 10 into the existing circuit. This can be done by connecting the lines indicated by the reference numerals 24, 25 and 26 into the existing turn signal circuit in a manner shown in the FIGURE.

The invention as described is shown being actuated by the application of the vehicle brakes. Although this is a preferred usage, others are possible. For example, the flashing circuit 10 can be actuated by the removal of the driver's foot from the accelerator of the automobile. The flashing circuit can also be actuated by an accelerometer which detects a predetermined slow down of the vehicle. Both of these types of operation are within the purview of one skilled in art having the invention as described before him, and are fully within the scope of the invention.

Although this invention has been described with respect to a particular embodiment thereof, it is not to be so limited, as changes and modifications may be made therein which are within the spirit and scope of the invention as defined by the appended claims.

I claim:

1. In a vehicle brake and turn signalling system having a power source, a plurality of signal lamps, a turn signal switch for connecting a first arrangement of said lamps to said power source for signalling an intended turn of the vehicle, a first flasher in circuit with said turn signal switch for periodically interrupting power to the lamps of said first arrangement, a second switch for connecting a second arrangement of said lamps to said power source to signal deceleration of the vehicle, a second flasher in circuit with said second switch for periodically interrupting power to the lamps of said second arrangement and means for disabling said second flasher after a predetermined lapse of time to provide uninterrupted power to said second arrangement of lamps, the improvement in said disabling means comprising:
   an electromagnetic relay having switch contacts connected to bypass said second flasher upon energization of said relay and thereby supply uninterrupted power to said second arrangement of lamps,
   a transistor controlling operating current for said relay and normally biased to a nonconductive state causing said relay contacts to be normally open, and
   a charging circuit receiving impulses of power from said second flasher and providing after the accumulation of a predetermined charge a bias output for overcoming the normal bias of said transistor to cause said transistor to conduct thereby energizing said relay and closing said relay contacts.

2. The improvement claimed in claim 1 with additionally a connection to said charging circuit from said turn signal switch for providing a charge sufficient to bias said transistor conductive substantially immediately after closure of said turn signal switch and thereby immediately energize said relay to disable said second flasher.

3. The improvement of claim 2 wherein:
   said second switch and said second flasher are connected in series between said power source and said second arrangement of lamps; said transistor and the electromagnet of said relay being connected in series and to said second switch whereby said relay is energized upon closure of said second switch and upon conduction of said transistor; and
   said charging circuit comprises a resistor and a capacitor connected in series, with said capacitor being connected to supply bias to said transistor and said resistor being connected to receive power impulses from said second flasher.